United States Patent
Stephan et al.

(10) Patent No.: US 6,828,544 B2
(45) Date of Patent: Dec. 7, 2004

(54) ACTIVE NIGHT VISION SYSTEM FOR VEHICLES EMPLOYING ANTI-BLINDING SCHEME

(75) Inventors: Craig Hammann Stephan, Ann Arbor, MI (US); Jeffrey Thomas Remillard, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 10/064,120

(22) Filed: Jun. 12, 2002

(65) Prior Publication Data

US 2003/0230705 A1 Dec. 18, 2003

(51) Int. Cl.$^7$ ................................................ H01J 40/14
(52) U.S. Cl. ........................ 250/214 VT; 250/214 R; 313/523
(58) Field of Search ................... 250/214 VT, 214 AL, 250/214 R, 214 B, 214 C, 214 LA, 338.1, 339.11; 313/532, 539, 544

(56) References Cited

U.S. PATENT DOCUMENTS

| 4,091,412 A | 5/1978 | Salonimer |
| 5,050,986 A | 9/1991 | Gatto et al. |
| 5,519,209 A | 5/1996 | Rapoport et al. |
| 5,760,887 A | 6/1998 | Fink et al. |
| 6,094,160 A | 7/2000 | Lajiness |
| 6,576,884 B1 * | 6/2003 | Ostromek et al. .... 250/214 VT |

* cited by examiner

Primary Examiner—Stephone B. Allen
(74) Attorney, Agent, or Firm—Frank A. MacKenzie

(57) ABSTRACT

A night vision system for a vehicle includes a pulsed light source for illuminating a region proximate the vehicle, the light source operating at a predetermined pulse timing. A light sensor generates a light intensity signal in response to detecting light at approximately the same wavelength as light from the light source. A controller receives first and second light intensity signals from the light sensor corresponding to first and second time periods between pulses of the light source, compares the first and second light intensity signals, and modifies the light source pulse timing as a function of a ratio or difference between the first and second light intensity signals, to avoid blinding of the vehicle's night vision system by similarly-equipped vehicle's traveling in the opposite direction.

20 Claims, 4 Drawing Sheets

US 6,828,544 B2

ACTIVE NIGHT VISION SYSTEM FOR VEHICLES EMPLOYING ANTI-BLINDING SCHEME

BACKGROUND OF INVENTION

The present invention relates to a night vision system for detecting objects at relatively low visible light levels. In particular, the invention concerns an active night vision system having an anti-blinding scheme employing pulsed illumination and synchronization with detected pulsed light sources from oncoming vehicles.

Night vision systems are utilized to allow a user to see objects at relatively low visibility light levels. Night vision systems typically are classified as either passive night vision systems or active night vision systems. In known passive night vision systems used in automotive applications, mid-infrared cameras are used to image objects using the ambient infrared light emitted by the objects in the environment. Mid-infrared night vision systems have relatively few pixels and, accordingly, images formed using such cameras have low video resolution and a relatively narrow field of view. Known active night vision systems utilize a near-infrared (NIR) laser diode or a filtered incandescent light source to generate NIR light. The NIR light is subsequently reflected off objects in the environment and is received by a NIR-sensitive camera. The camera generates a video signal responsive to received light.

An improved active night vision system is disclosed in U.S. patent application Ser. No. 09/598,484 entitled "A Night Vision System Utilizing A Diode Laser Illumination Module And A Method Related Thereto," which is herein incorporated by reference. That application describes an active night vision system that uses a NIR diode laser to illuminate the region forward of the vehicle, and a CCD camera to process and display images within the illuminated region. Because NIR light is invisible to the human eye, the laser light can be formed into a high beam pattern to illuminate potential hazards without blinding oncoming vehicle operators. Such systems, however, are susceptible to blinding by oncoming vehicles similarly equipped with a night vision NIR light source.

One solution to night vision system blinding by oncoming vehicles similarly equipped with a NIR light source is provided in U.S. patent application Ser. No. 09/683,840 entitled "GPS-Based Anti-Blinding System For Active Night Vision." In that application, GPS is used to determine the direction of travel of the vehicles as well as an absolute time reference. Vehicles proximate one another synchronize their pulsed light sources to the absolute time reference signal with the phase of the light pulse based on the direction of motion of the respective vehicles. In this way, two cars approaching one another from opposite directions will have their NIR light sources pulsed out-of-phase with each other at duty cycles below 50% to avoid having their light source "on" when the opposing vehicle's camera is also "on." The disclosed anti-blinding scheme, however, requires that all night vision equipped vehicles must also be equipped with GPS systems.

Thus, there exists a need for alternate night vision systems and methods related thereto that mitigate or eliminate blinding of the vehicle's night vision system by similarly equipped approaching vehicles.

SUMMARY OF INVENTION

The present invention provides an active night vision system and method related thereto which mitigates the blinding effects of nearby similarly equipped vehicles. The anti-blinding scheme of the present invention synchronizes the pulsed light sources of respective vehicles approaching each other from opposite directions to be out-of-phase without the use of GPS or any other external reference source. A night vision system in accordance with one embodiment of the present invention includes an illuminating device such as a NIR light source and beam-forming optics for illuminating a region in the forward direction of travel of the vehicle. A receiver, such as a camera, receives light reflected off objects in the illuminated region and generates a video signal responsive to the received light. A light sensor, such as a photodiode, generates a light intensity signal in response to detecting light at approximately the same wavelength as light emitted by the pulsed light source. The controller is adapted to receive the light intensity signal during first and second time periods between pulses of the light source. The light intensity signals are compared during the first and second time periods, and the light source pulse timing is modified in response to a difference in the respective light intensity levels during the first and second time periods. The difference in light intensity levels during the respective time periods indicates that another source of light at approximately the same wavelength as the pulsed light source is present, but is not exactly in-phase or out-of-phase with the reference vehicle's pulsed light source. Thus, the timing of the pulsed light source is modified such that the light intensity levels during the inactive period are substantially constant. This is indicative of the oncoming vehicle's pulsed light source being exactly out-of-phase with the present vehicle's pulsed light source.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanying drawings and described below by way of examples of the invention.

In the drawings.

DETAILED DESCRIPTION

Figure 1:
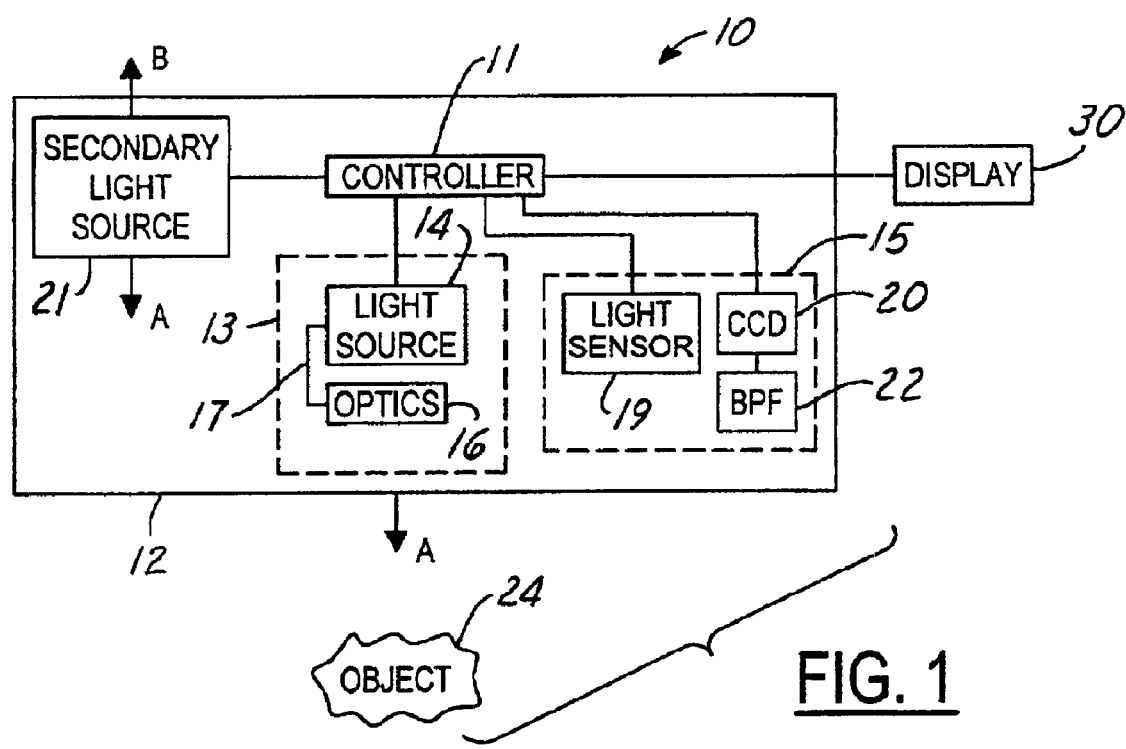
FIG. 1 is a schematic block diagram of a night vision system in accordance with one embodiment of the present invention.

Referring now to the drawings wherein like reference numerals are used to identify identical components in the various views, FIG. 1 illustrates a night vision system for detecting objects at relatively low visibility light levels. The system 10 may be utilized in a plurality of applications. For example, the system 10 may be used in an automotive vehicle to allow a driver to see objects at night that would not otherwise visible to the naked eye. As illustrated, the system 10 includes a controller 11, an illumination subsystem 13, a receiver 15 and, in an alternate embodiment described below, a secondary light source 21.

Several of the system components may be included within a housing 12. It should be understood, however, that the components of system 10 contained within housing 12 could be disposed at different locations within the vehicle wherein the housing 12 may not be needed. For example, the components of the system 10 could be disposed at different operative locations in the automotive vehicle such that a single housing 12 would be unnecessary. Housing 12 is provided to enclose and protect the various components of the system 10. Housing 12 may be constructed from a plurality of materials including metals and plastics.

As will be discussed in more detail below, the system 10 may be used to detect any reflective object, such as object 24, in operative proximity to the system 10.

The controller 11 is preferably a microprocessor-based controller including drive electronics for the illumination subsystem 13 and receiver 15, and image processing logic for the display system 30. In an alternate embodiment described below, controller 11 also includes drive electronics for the secondary light source 21. Alternatively, display unit 30 may include its own respective control logic for generating and rendering image data.

The illumination subsystem 13 includes a NIR light source 14, beam-forming optics 16, and a coupler 17 between the two. Many light source and optics arrangements are contemplated by the present invention. For example, the light source 14 may be a NIR diode laser, the beam forming optics 16 may comprise a thin-sheet optical element followed by a holographic diffuser, whose combined purpose is to form a beam pattern in the direction of arrow A comparable to the high-beam pattern used for normal vehicle headlamps; and the coupler 17 between the light source 14 and optics 16 can be a fiber-optic cable.

The illumination subsystem illuminates the driving environment without blinding drivers in approaching vehicles, since the NIR light is not visible to the human eye. The light source 14 may comprise a NIR diode laser or light-emitting diode, or any other NIR source that can be switched on and off at frequencies at or exceeding typical video frame rates (30–60 Hz). For example, the light source 14 may include a single stripe diode laser, model number S-81-3000-C-200-H manufactured by Coherent, Inc. of Santa Clara, Calif. Further, the coupler may be a fiber-optic cable, or the light source could be directly coupled to the optical element 16 through a rigid connector, in which case the coupler would be a simple lens or reflective component. The coupler 17, depending upon the spread characteristics of the light source 14 may be omitted altogether.

Although the system 10 preferably uses a NIR laser light source, an alternate embodiment of system 10 may utilize a conventional light emitting diode NIR source, or any other type of NIR light source, as long as it is capable of pulsed operation, in lieu of the infrared diode laser.

The secondary light source 21 is used as a trigger pulse light source. Secondary light source can comprise any type of pulsed light source but preferably is an infrared light source operating at a different wavelength than primary light source 14. The secondary light source 21 can be used to synchronize the gating of the primary light source and receiver 15 to eliminate the blinding effects which are possible when two similarly equipped vehicles approach one another from opposite directions. The secondary light source 21 is also configured to emit light in the same direction as the illumination subsystem 13, which is indicated by direction arrow A corresponding to the forward direction of travel of the vehicle. The secondary light source can also be configured to transmit light in the direction of indicator arrow B corresponding to the direction rearward of the vehicle. The rearwardly directed trigger pulse is used to synchronize the night vision illumination systems of commonly-equipped vehicles traveling in the same direction as described in further detail below with reference to FIG. 4. If the same light source cannot be physically configured to emit light at the second wavelength in both direction A and direction B, two separate light sources may be necessary. In such a case, the additional light source would be a tertiary light source identical to the secondary light source. To distinguish light emitted by the secondary light source 21 in direction A, from light emitted in direction B, the secondary light source is capable of transmitting pulses of different duration. The pulse width can then be used by other vehicles to determine whether the light detected from another vehicle's secondary light source came from the front of the other vehicle or rear of the other vehicle. Of course, characteristics other than, or in addition, to, pulse width can distinguish a forward trigger pulse ($T_F$) from a rearward trigger pulse ($T_R$). For example, the wavelength of light may differ.

More than one rearward trigger pulse ($T_{R1}$, $T_{R2}$) may be necessary to convey synchronization information to vehicles following a reference vehicle. Thus, the secondary (or tertiary) light source includes the capability to further distinguish the normal rearward trigger pulse ($T_{R1}$) from synchronized rearward trigger pulse ($T_{R2}$). Again, this characteristic may be a different pulse width and/or wavelength of light (third wavelength of light). Another distinguishing characteristic may include a double pulse.

The receiver 15 includes a NIR-sensitive camera 20 and optical band pass filter 22. The NIR-sensitive camera 20 provides a video signal responsive to reflected infrared light received by the camera 20. The camera 20 may comprise a CCD camera or a CMOS camera. In one embodiment of the system 10, the CCD camera is camera model number STC-H720 manufactured by Sentech Sensor Technologies America, Inc. Infrared light emitted from the illumination subsystem 13 and reflected off the object 24 in the environment is received by the NIR-sensitive camera 20. The video signal is transmitted to the controller 11 or directly to the display module 30 where it is processed and displayed to allow the vehicle operator to see the object 24. The display 30 may be a television monitor, a CRT, LCD, or the like, or a heads-up-display positioned within the automotive vehicle to allow the user to see objects illuminated by the system 10.

The optical band pass filter 22 is provided to filter the infrared light reflected from the object 24. In particular, the filter 22 only allows light within the NIR light spectrum to be received by the camera 20. Preferably, the filter 22 allows a maximum transmission of light at a wavelength equal to the wavelength of light generated by the NIR light source 14. An advantage of using the filter 22 is that the filter 22 prevents saturation of the pixel elements (i.e., blooming) in the camera 20 by visible light emitted from the headlamps of other automotive vehicles. The filter 22 is preferably disposed proximate to a receiving lens in the camera 20.

The light sensor 19 in a first embodiment includes a photodiode or photocell or similar light sensor mounted in the receiver module 15 and filtered, such as by band pass filter 22, to be sensitive only to light at the same wavelength as primary light source 14. Alternatively, the average output signal of the camera 20, spatially integrated over some or all of its field of view, could serve as the light sensor 19. In one embodiment, the light sensor 19 is configured to detect light at the wavelength corresponding to the secondary light source 21. Preferably, the wavelength of light emitted by the secondary light source is different than the wavelength of light emitted by the primary light source 14.

Figure 2:
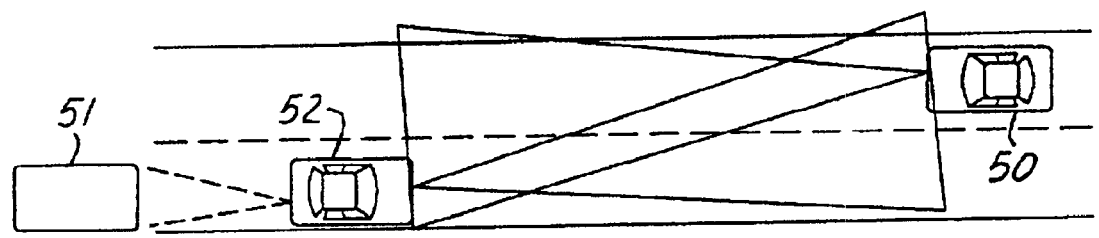
FIG. 2 is a schematic diagram of a vehicle-operating environment in which the present invention may be used to advantage.

Referring now to FIG. 2 there is shown a vehicle-operating environment wherein the present invention may be used to advantage. In FIG. 2, two vehicles 50, 52 are shown approaching one another from opposite directions. Both vehicles 50, 52 are similarly equipped with a night vision system 10 in accordance with the present invention. If the illumination sources of vehicles 50 and 52 were simultaneously on, the respective receivers of both vehicles 50, 52 would be saturated or "blinded" by the opposing vehicle's illumination device. In the present invention, this is avoided by gating the illumination device and receiver on and off as a function of a timing signal determined from light sensor 19.

Figure 3:
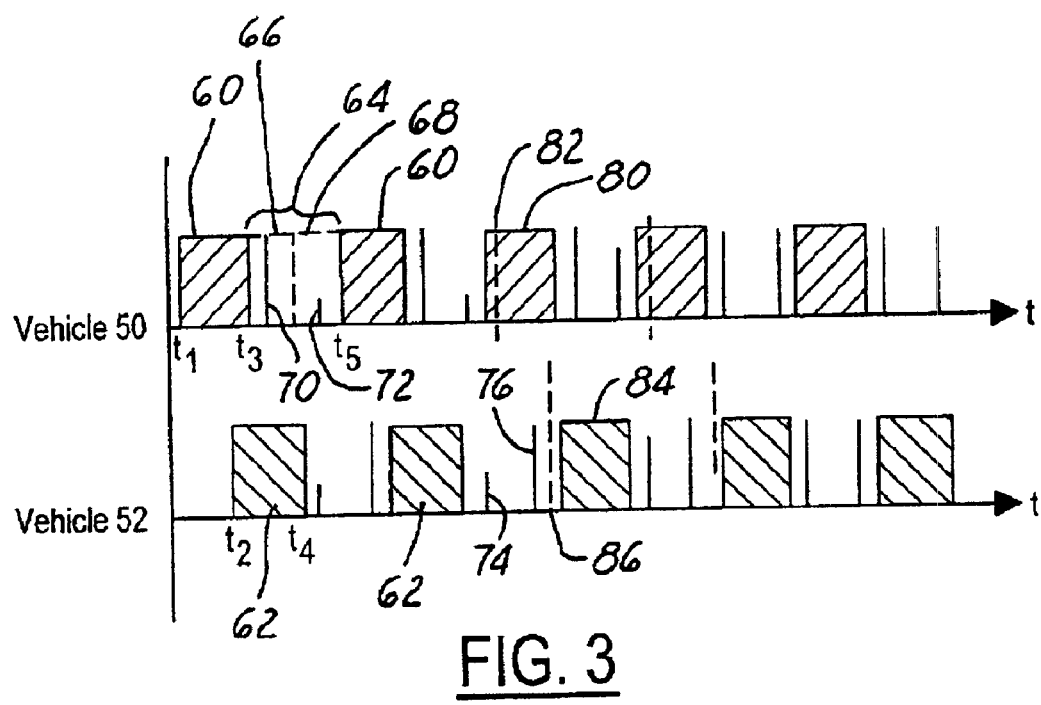
FIG. 3 is a graph showing the timing of the night vision signals for the vehicles of FIG. 2 in accordance with one embodiment of the present invention.

Referring now to FIG. 3, there is shown a timing graph illustrating the night vision signals for the vehicles 50, 52 of FIG. 2 in accordance with a first embodiment of the present invention. The upper portion of FIG. 3 illustrates the pulse sequence for the primary light source of vehicle 50 (FIG. 2) used in the active night vision system. The primary light source pulses are indicated as reference numeral 60. The pulsed light source is being operated at a duty cycle of less than 50%. Similarly, the receiver 15 and, in particular, the camera 20 operates only during that portion of the cycle when the primary light source is on. Similarly, the pulsed light source of approaching vehicle 52 (FIG. 2) is illustrated in the lower portion of FIG. 3 wherein the primary light source pulses are indicated at reference numeral 62. Vehicle 52 also is operating its primary light source at a duty cycle below 50%. If the two approaching vehicles are able to coordinate their respective light pulses such that they are out-of-phase with each other, then night vision system blinding is avoided. As described herein, the light sensor 19 is used to ensure that the opposing night vision systems are synchronized out-of-phase with each other.

Specifically, in the first embodiment, the light sensor 19 is activated during the interval 64 between time periods $t_3$ and $t_5$ when the primary light source is inactive. In other words, light source data is collected between adjacent pulses of the primary light source. The interval 64 between the laser pulses is divided into two approximately equal length time windows 66, 68. The light sensor 19 and associated electronics integrate the light received in each window 66, 68 to generate a respective light intensity signal. The light intensity signal for the first window 66 is represented by reference numeral 70 and the light intensity signal for the subsequent window 68 is represented by reference numeral 72. The light intensity signal 70 is greater than the light intensity signal 72 because the light sensor "sees" the light emitted by the opposing vehicle's primary light source (indicated as light pulse 62) for the duration of the first time window 66. In contrast, for the duration of the second time window 68, the light sensor is excited only a portion of the time by the opposing vehicle's primary light source. This difference in the light intensity signal 70, 72 indicates to the night vision system controller of vehicle 50 that an approaching vehicle is emitting light at the wavelength of the primary light source which is not exactly in-phase or out-of-phase with that of the first vehicle's primary light source.

Thus, based on the initial arbitrary phase relationship shown for the pulsed primary light sources of vehicle 50 and vehicle 52, the controller of vehicle 50 detects that the first half 66 of the window 64 is "brighter" than the second half 68 of the window 64. Similarly, the controller of vehicle 52 detects the opposite situation. In particular, vehicle 52 detects that the light intensity signal 74 in the first time period as less intense than the light intensity signal 76 in the second time period of the interval between light pulses from the primary light source.

Referring again to vehicle 50, because the light intensity signal 70 during the first time period 66 is greater than the light intensity signal 72 during the second time period 68, the controller of vehicle 50 advances the next light pulse 80 from where it would have otherwise occurred as indicated by reference numeral 82. Similarly, with respect to vehicle 52, because the light intensity signal 74 during the first time period was less than the light intensity signal 76 during the second time period during the interval between respective light pulses, the next light pulse 84 in sequence is delayed from the time in which it would have otherwise occurred as indicated by reference numeral 86. In succeeding pulses, further adjustments are made as necessary to bring the two pulse trains to a closely out-of-phase condition. The amount of the pulse delay or pulse advance can be either fixed or variable as a function of the relative difference between or ratio of the two light intensity signals 70, 72 in the case of vehicle 50, and 74, 76 in the case of vehicle 52.

Alternatively, the light sensor 19 and associated electronics are activated as before during the interval 64 between time periods $t_3$ and $t_5$ when the primary light source is inactive; however, rather than integrating the light received during this period, the sensor and electronics look for transitions in light intensity exceeding a threshold magnitude and abruptness. The transitions may be from low intensity to high intensity or vice versa. For example, with reference to FIG. 3, vehicle 50 detects a single high to low transition at time $t_4$ as the beam from vehicle 52 is turned off, and vehicle 52 detects a single low to high transition at time $t_5$ as the beam from vehicle 50 is turned on. Detection of a single high to low transition causes vehicle 50 to shift its pulses slightly earlier; detection of a single low to high transition cause vehicle 52 to shift its pulses slightly later. At some point the light pulses will cease to overlap and each car will see a low to high, followed by a high to low transition. Each car continues to adjust the phase of its light pulses until the other car's pulses are exactly centered between its own.

Alternatively, a vehicle detecting another night-vision-equipped vehicle approaching it, immediately switches the phase of its pulse train to be exactly out-of-phase with the approaching car, using either of the methods described above.

Figure 4:
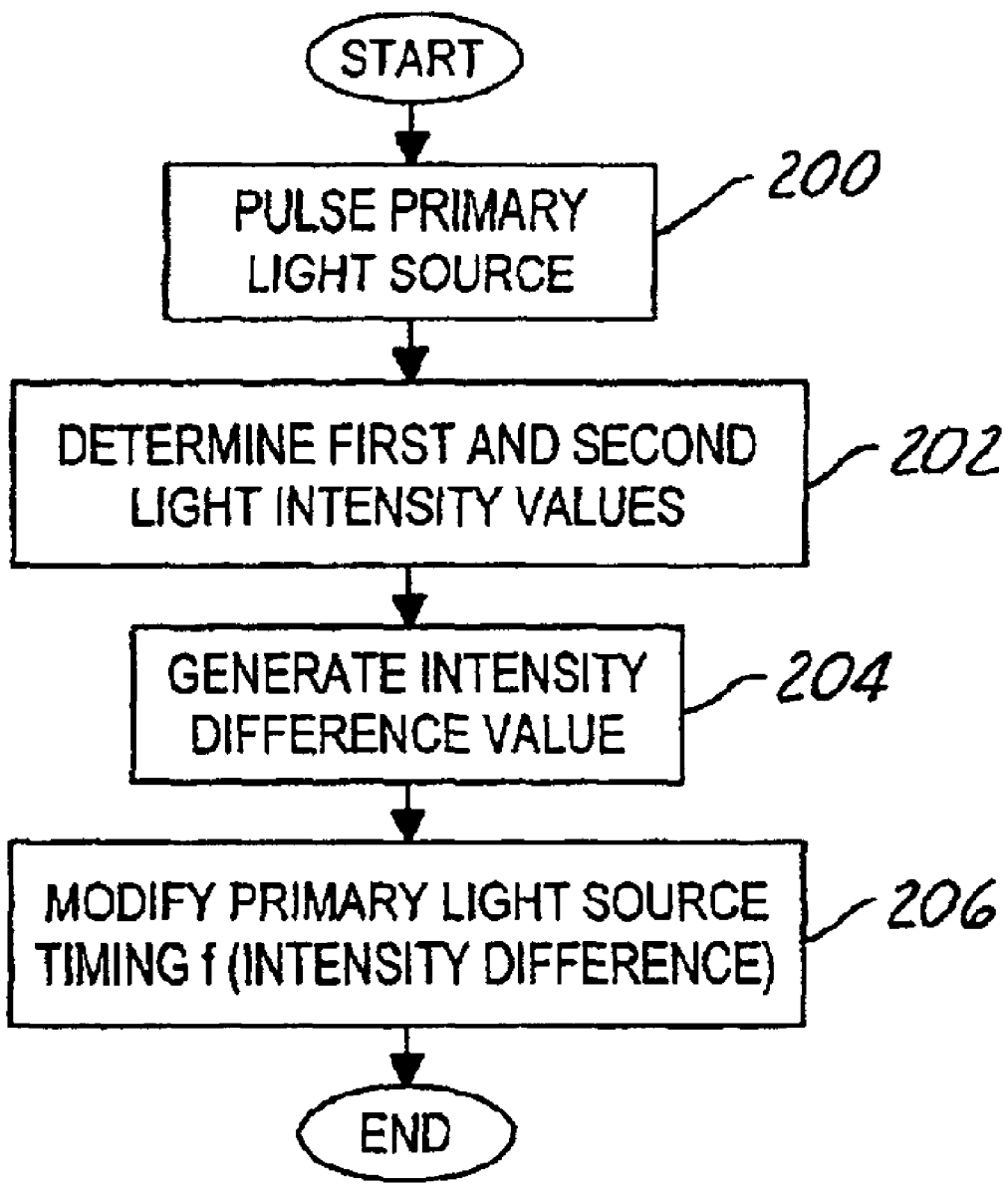
FIG. 4 is a logic flow diagram of one method of operating the night vision system according to the present invention.

Referring now to FIG. 4 there is shown a logic flow diagram of a method of operating a night vision system in accordance with the anti-blinding scheme of FIG. 3. The logic begins in step 200 by operating the night vision equipped vehicle's primary light source in a pulse mode at a duty cycle of less than approximately 50%. block 202 during the "off" time of the primary night vision light source, the light sensor determines first and second light intensity values corresponding to the detected light amount in the first half of the "off" time period and the second half of the time period when the primary light source is off. These two values are compared in block 204 to generate a ratio or difference value. In block 206, the timing of the primary light source pulses is modified as a function of the difference value or ratio generated in block 204. Alternatively, the primary light source pulse timing can be modified in fixed increments so long as the ratio or difference value exceeds a threshold amount. In this way, when the light intensity values in the first and second time windows are approximately equal, the vehicle's primary night vision light source will be out-of-phase with any detected night vision light source from a similarly equipped vehicle.

From the foregoing, it can be seen that there has been brought to the art a new and improved vehicle active night vision system which has advantages over prior vehicle night vision systems. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A night vision system for a vehicle comprising:
    a pulsed light source for illuminating a region proximate the vehicle, said light source operating at a predetermined pulse timing;
    a light sensor for generating a light intensity signal in response to detecting light at approximately the same wavelength as light from said light source; and
    a controller programmed to receive first and second light intensity signals from said light sensor corresponding to first and second time periods between pulses of said light source, compare said first and second light intensity signals, and modify said light source pulse timing as a function of a difference or ratio between said first and second light intensity signals.

2. A night vision system according to claim 1 comprising a gated receiver for receiving light reflected off objects illuminated in said region by said pulsed light source and generating a signal responsive to said received light, and wherein said pulsed light source is a laser diode operating at a duty cycle of less than 50%.

3. A night vision system according to claim 1 wherein said light sensor is a photocell or photodiode.

4. A night vision system according to claim 1 wherein said light sensor is a camera.

5. A night vision system according to claim 1 wherein said controller is programmed to modify said light source pulse timing by a fixed amount when said ratio or difference value exceeds a threshold value.

6. A night vision system according to claim 1 wherein said controller is programmed to modify said light source pulse timing by a variable amount related to said ratio or difference value.

7. A night vision system according to claim 6 wherein said controller is programmed to modify said light source pulse timing to occur earlier when said first light intensity signal is greater than said second light intensity signal.

8. A method for an active night vision system for a vehicle comprising:
    pulse activating a light source to illuminate a region proximate the vehicle, said light source operating at a first wavelength and predetermined pulse timing;
    detecting light at said first wavelength during a first time period between respective pulses of said light source to generate a first light intensity value;
    detecting light at said first wavelength during a second time period between respective pulses of said light source to generate a second light intensity value; and
    modifying said light source pulse timing as a function of a ratio or difference between said first and second light intensity values.

9. A method according to claim 8 wherein modifying includes modifying said light source pulse timing by a fixed amount when said ratio or difference value exceeds a threshold value.

10. A method according to claim 8 wherein modifying includes modifying said light source pulse timing by a variable amount related to said ratio or difference value.

11. A method according to claim 8 wherein pulse activating a light source includes operating a laser diode at a duty cycle of less than 50%.

12. A night vision system for a vehicle comprising:
    a pulsed light source for illuminating a region proximate the vehicle, said light source operating at a predetermined pulse timing;
    a light sensor for generating a light change signal between pulses of said light source in response to detecting a change in intensity of light at approximately the same wavelength as light from said light source; and
    a controller programmed to receive said light change signal from said light sensor corresponding to a time period between pulses of said light source, and modify said light source pulse timing as a function of said light change signal.

13. A night vision system according to claim 12 comprising a gated receiver for receiving light reflected off objects illuminated in said region by said pulsed light source and generating a signal responsive to said received light, and wherein said pulsed light source is a laser diode operating at a duty cycle of less than 50%.

14. A night vision system according to claim 12 wherein said light sensor is a photocell, photodiode, or camera.

15. A night vision system according to claim 12 wherein said light change value is a high-to-low signal or low-to-high signal and said controller is programmed to modify said light source pulse timing by a fixed amount in a direction corresponding to said light change signal.

16. A night vision system according to claim 12 wherein said light change value is a high-to-low signal or low-to-high signal and said controller is programmed to modify said light source pulse timing by a variable amount in a direction corresponding to said light change signal.

17. A night vision system according to claim 16 wherein said light change value is a high-to-low signal or low-to-high signal and said controller is programmed to modify said light source pulse timing to occur earlier when said light change signal is a high-to-low signal.

18. A method for an active night vision system for a vehicle comprising:
    pulse activating a light source to illuminate a region proximate the vehicle, said light source operating at a first wavelength and predetermined pulse timing at a duty cycle less than 50%;
    detecting light at said first wavelength during a first time period between respective pulses of said light source to generate a light change signal, said light change signal representing a high-to-low light change or a low-to-high light change; and
    modifying said light source pulse timing as a function of said light change signal.

19. A method according to claim 18 wherein modifying includes modifying said light source pulse timing by a fixed amount in a direction related to said light change signal.

20. A method according to claim 18 wherein modifying includes modifying said light source pulse timing by a variable amount in a direction related to said light change signal.

* * * * *